US012337749B2

(12) United States Patent
Gorski et al.

(10) Patent No.: US 12,337,749 B2
(45) Date of Patent: Jun. 24, 2025

(54) ADAPTIVELY STEERED VEHICLE HEADLAMPS USING DRIVER GAZE DIRECTION AND HEAD DIRECTION

(71) Applicant: FORD GLOBAL TECHNOLOGIES, LLC, Dearborn, MI (US)

(72) Inventors: Ryan J. Gorski, Grosse Pointe Farms, MI (US); John R. Van Wiemeersch, Novi, MI (US); Jian Wan, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 198 days.

(21) Appl. No.: 18/093,395

(22) Filed: Jan. 5, 2023

(65) Prior Publication Data
US 2024/0227663 A1 Jul. 11, 2024

(51) Int. Cl.
*B60Q 1/08* (2006.01)

(52) U.S. Cl.
CPC ........ *B60Q 1/085* (2013.01); *B60Q 2300/052* (2013.01); *B60Q 2300/23* (2013.01)

(58) Field of Classification Search
CPC ............................ B60Q 1/085; B60Q 2300/23
See application file for complete search history.

(56) References Cited

U.S. PATENT DOCUMENTS

| | | | |
|---|---|---|---|
| 7,914,187 B2 | 3/2011 | Higgins-Luthman et al. | |
| 10,604,063 B2 | 3/2020 | Kita et al. | |
| 2009/0016073 A1* | 1/2009 | Higgins-Luthman | B60Q 1/085 362/465 |
| 2009/0273687 A1* | 11/2009 | Tsukizawa | G06T 7/74 348/222.1 |
| 2022/0250535 A1 | 8/2022 | Assaliyski | |

FOREIGN PATENT DOCUMENTS

| | | | | |
|---|---|---|---|---|
| CN | 107433898 A | * | 12/2017 | ............. B60Q 1/085 |
| CN | 111216620 A | | 6/2020 | |
| DE | 102014205864 A1 | | 10/2015 | |
| IN | 217743 | | 9/2008 | |

* cited by examiner

*Primary Examiner* — Aaron L Troost
(74) *Attorney, Agent, or Firm* — Frank L. Lollo; MacMillan, Sobanski & Todd, LLC

(57) ABSTRACT

A vehicle for travelling on a roadway with a driver has a driver monitor, a head lamp system, and a controller. The driver monitor senses a driver gaze angle relative to a vehicle heading along the roadway and senses a driver head angle relative to the vehicle heading. The a headlamp system has a steerable headlamp configured to illuminate the roadway with a light beam along a selectable projection angle. The controller is configured to compare the driver gaze angle to a first threshold angle, determine a difference between the driver gaze angle and the driver head angle, and when the driver gaze angle is greater than the first threshold angle and the difference is less than a second threshold angle, then adjust the projection angle to a target angle based on the driver gaze angle.

10 Claims, 6 Drawing Sheets

ADAPTIVELY STEERED VEHICLE HEADLAMPS USING DRIVER GAZE DIRECTION AND HEAD DIRECTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to roadway illumination for automobiles and trucks, and, more specifically, to adjusting adaptive headlight systems based on a direction in which a driver is looking.

Adjustable/adaptive headlamp systems are known which employ various mechanisms to steer illumination provided by headlamps toward a selected direction relative to the heading of the vehicle. Steering of light away from a default direction (e.g., pointing straight ahead along the forward axis of the vehicle) may be done for a variety of purposes. For example, when the vehicle is being steered around a curve in the road, adaptive headlight systems may direct more light toward the direction of the turn (at an angle proportional to the curve as determined by a steering wheel orientation). When approaching an intersection, the pattern of the light beam may shift to one side of the road or the other in preparation for the possibility of turning.

When driving along a straight roadway, there may be times when it is desirable for the headlamps to cover more of the side of the road (e.g., to highlight any obstacles or animals beside the road). This may be particularly helpful if the vehicle is in the center or left lane of a two-lane or three-lane road.

Adaptive headlight systems can also be used to restrict a light level directed toward certain objects by steering the light beam elsewhere. In the case of oncoming vehicles, the headlamp beams can be directed away from shining into the vision of the oncoming drivers and avoiding glare.

Object detection systems have been used with adaptive headlamps in order to steer illumination toward detected objects, such as an animal in or near the roadway. However, object detection and classification may be unable to handle subtle or rare types of objects such as small animals, an obscured driveway, or a dirt road.

Some adaptive headlamp systems have used driver monitoring in order to direct a headlamp according to an area where the driver appears to be directing their attention. For example, eye tracking has been used to detect a gaze direction of a driver to instruct the headlamps to provide more light where the driver is looking. However, a driver's gaze spends much time scanning the roadway and surroundings to maintain situational awareness. Thus, steering the headlamps to match the detected gaze can cause erratic sweeping movements of the headlamps. Monitoring of the orientation of the driver's head has also been employed. However, the relationship between head orientation and the focus of the driver's attention is less reliable. For example, a driver may move their head even though they are maintaining their gaze along the forward traveling direction of the vehicle.

The pointing of headlamp beams are subject to various rules and regulations which must be followed at all times. For example, beam steering may be prohibited where it raises a potential for causing glare to another driver. While such adaptive headlight rules will take priority, there will still be room for certain adjustments to improve visibility by steering a headlamp beam in appropriate cases.

SUMMARY OF THE INVENTION

The invention combines gaze determination (e.g., eye tracking) with head tracking to ensure that when a driver gazes away from the travelling direction of the vehicle that their intention is to perform a detailed inspection along a particular line-of-sight which corresponds generally to an area at or near the level of the roadway. This takes advantage of the tendencies of a typical driver wherein the head is kept generally forward during visual scanning of a roadway environment and wherein the head is turned to the side along with the gaze direction when the driver directs a fuller attention level to a particular area.

In one aspect of the invention, a vehicle for travelling on a roadway with a driver comprises a driver monitor, a head lamp system, and a controller. The driver monitor senses a driver gaze angle relative to a vehicle heading along the roadway and senses a driver head angle relative to the vehicle heading. The headlamp system has a steerable headlamp configured to illuminate the roadway with a light beam along a selectable projection angle. The controller is configured to compare the driver gaze angle to a first threshold angle, determine a difference between the driver gaze angle and the driver head angle, and when the driver gaze angle is greater than the first threshold angle and the difference is less than a second threshold angle, then adjust the projection angle to a target angle based on the driver gaze angle.

As used herein, "driver" means (A) a person in a driver seat performing active operational control such as steering, acceleration, and braking, (B) in the case of an autonomous or semi-autonomous vehicle, a person monitoring the vehicle operations (with or without the potential for intervening using manual controls), or (C) any front row occupant of a vehicle who is visually inspecting the roadway or surrounding areas.

DETAILED DESCRIPTION OF PREFERRED EMBODIMENTS

In order to provide more illumination where the attention of the driver is focused, the preferred embodiments combine eye tracking (i.e., gaze determination) with head tracking according to a process which mitigates erratic headlamp movements. In an initial step, there is a detection that the driver's eyes are not looking straight ahead, but to one side or the other. In addition to looking to one side, the eye tracking will preferably also ensure that the gaze direction is generally horizontal through the windshield and towards the roadway (e.g., not looking up at billboards or looking down at something in the interior of the passenger cabin). Thus, the gaze direction should coincide with the driver looking within a predetermined elevation of the roadway. In a succeeding step, it is determined whether the driver's head orients toward the direction of the gaze, which is considered to be an indicator that an area outside the default headlamp projection pattern has captured the main attention of the driver. In response, a light beam projecting from the headlamp on the corresponding side of the vehicle may be steered toward the area of interest (provided the change is not prohibited by other factors such as potential for glare to other drivers).

Preferably, the redirection of the light beam may occur immediately once both the gaze direction and the head direction are aligned with a side target. This can help ensure that the driver can more easily detect an object of interest as soon as it is first noticed. To further reduce erratic movement of the light beam, the redirected light beam may be preferably held in the modified state for a predetermined delay even if the gaze direction and/or the head direction move away. Thus, the driver's eyes may continue to scan the general environment without terminating the redirected illumination since the side target may still be the main focus of their attention. The timing of the delay may begin only once the gaze direction and head direction have returned to looking straight ahead on the roadway or both toward some other position (e.g., toward a spot within an upcoming curve in the roadway). After expiration of the delay, the light beam may return to a default state.

Figure 1:
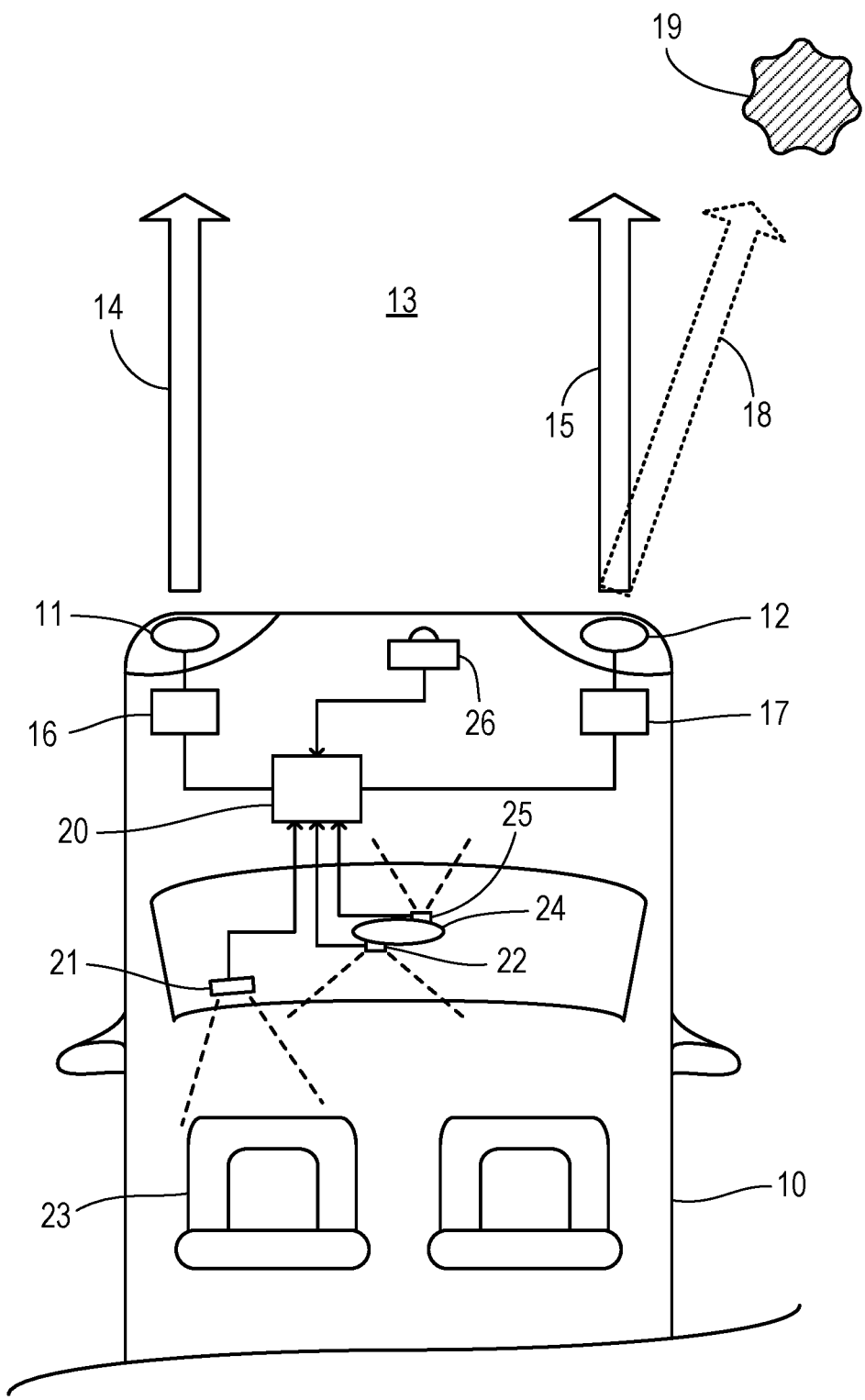
FIG. 1 is a schematic, block diagram showing a vehicle with adaptive headlamp steering which follows a driver gaze angle contingent on a driver head angle.

Referring to FIG. 1, a vehicle 10 includes a headlamp system having headlamps 11 and 12 configured to illuminate a roadway 13 in a forward travelling direction of vehicle 10. Headlamps 11 and 12 provide illumination patterns projecting generally along default directions 14 and 15. Beam adjusters 16 and 17 are coupled to headlamps 11 and 12, respectively, for adjusting the respective light beams along selectable projection angles. For example, a light beam from headlamp 12 can be steered to a modified projection angle 18 to increase illumination of a target area (e.g., object) 19. Beam adjusters 16 and 17 can be comprised of a mechanical or electronic adjuster as known in the art, and they are controlled by a controller 20 which is configured according to an embodiment of the invention disclosed herein.

Vehicle 10 further includes a driver monitor including cameras 21 and 22 with fields of view for monitoring a driver in a driver seat 23. Camera 21 may be mounted on a dashboard or steering wheel, and camera 22 may be mounted on a rearview mirror assembly 24. Cameras 21 and 22 may comprise visible and/or infrared devices for monitoring pupils of the driver's eyes and structures of the head, with resulting camera data provided to controller 20 to determine a driver gaze angle relative to a vehicle heading along the roadway and determining a driver head angle relative to the vehicle heading according to methods known in the art.

Vehicle 10 may also include forward looking sensors such as a camera 25 and a radar 26 to detect and characterize an exterior environment and objects in connection with conventional adaptive headlamp steering, for example.

As described in greater detail below, controller 20 may be configured to compare a driver gaze angle to a first threshold angle. Controller 20 then determines a difference between the driver gaze angle and a driver head angle. When the driver gaze angle is greater than the first threshold angle and the difference is less than a second threshold angle, then controller 20 adjusts the projection angle to a target angle (e.g., along projection angle 18) based on the driver gaze angle. The target angle may be equal to the driver gaze angle or may be adjusted to a maximum permitted angle toward the driver gaze angle due to limitations of the headlamp system or due to other factors such as potential glare.

Figure 2:
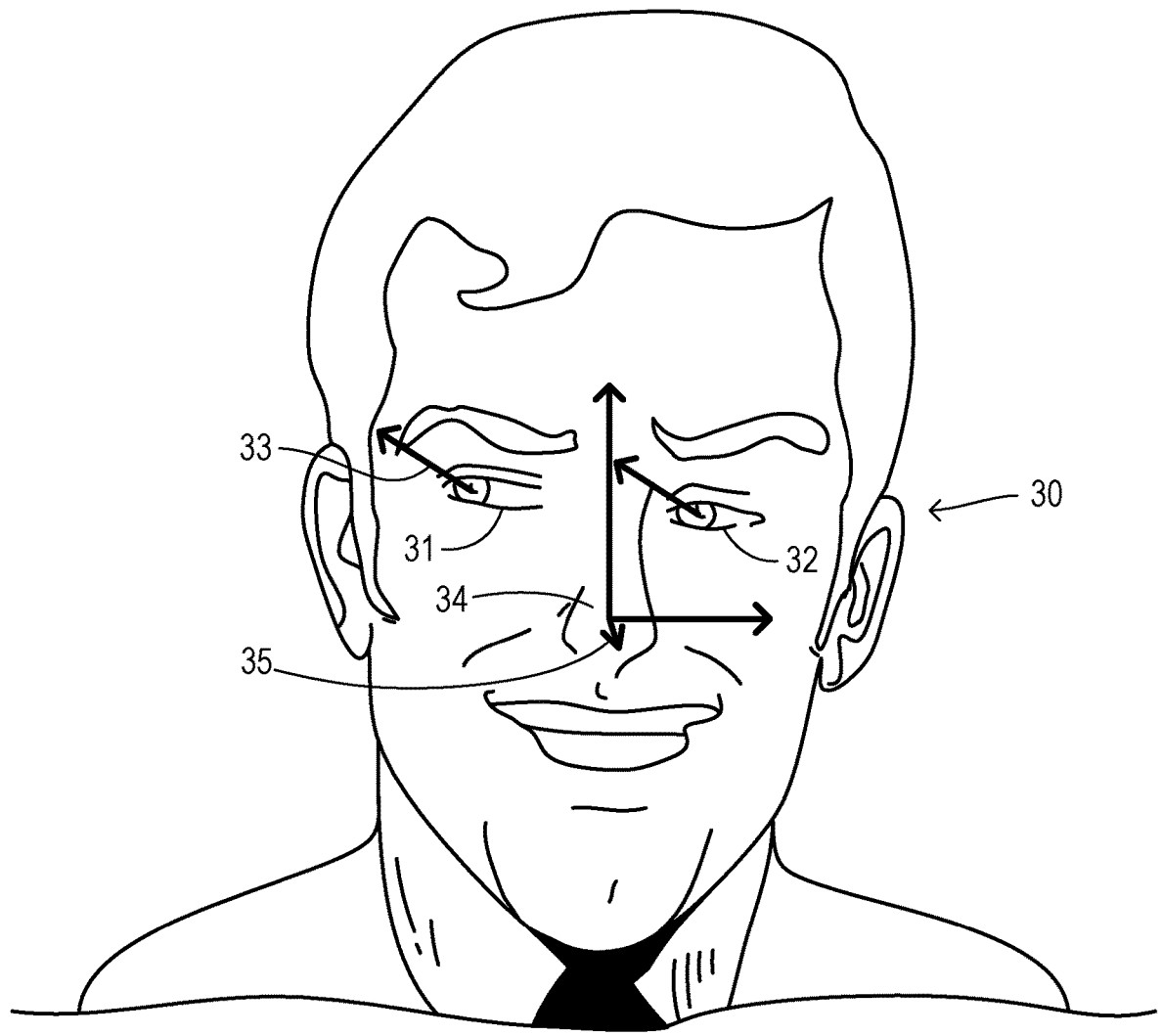
FIG. 2 depicts a front image of a driver in which a driver gaze angle and a driver head angle diverge from each other.

FIG. 2 shows a head 30 of a driver and eyes 31 and 32. Based on analysis of the positions of eye structures such as the pupils, a gaze angle 33 can be inferred using well known techniques or other methods. Based on analysis of the positions of eyes 31 and 32, a driver's nose 34, and/or other anatomical head structures, a driver head angle 35 can be inferred using well known techniques or other methods. As shown in FIGS. 3-6, the driver gaze angle and the driver head angle are determined relative to a vehicle heading 36. Vehicle heading 36 may be comprised of a fixed forward direction of the vehicle chassis or may be determined dynamically according to a steering direction of the vehicle (e.g., detected as a steering wheel angle). In particular, vehicle heading 36 may be comprised of an instantaneous steering trajectory in which the vehicle is travelling on the roadway.

Figure 3:
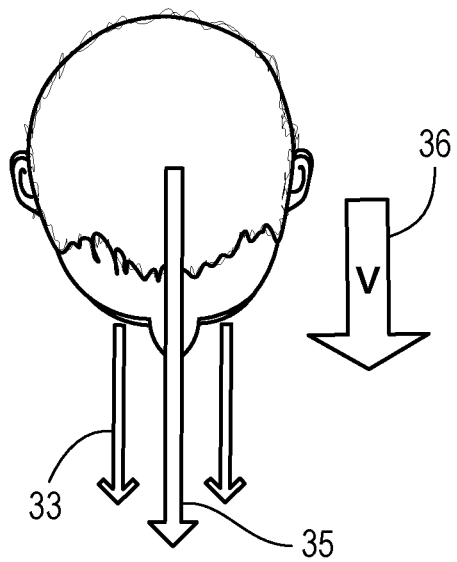
FIG. 3 is a top, schematic view showing a head of a driver with a driver gaze angle and a driver head angle both aligned with a vehicle heading.
Figure 4:
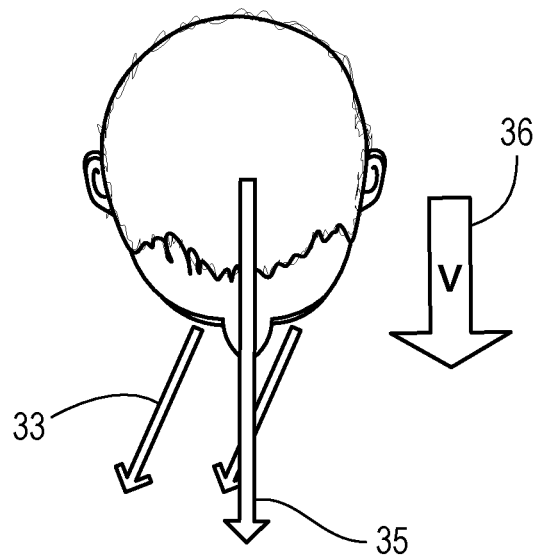
FIG. 4 is a top, schematic view showing a head of a driver with a driver gaze angle divergent from a vehicle heading and a driver head angle aligned with a vehicle heading.
Figure 5:
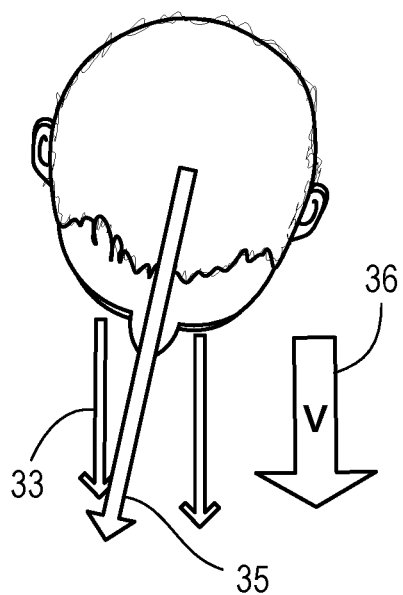
FIG. 5 is a top, schematic view showing a head of a driver with a driver gaze angle aligned with a vehicle heading and a driver head angle divergent from a vehicle heading.

FIG. 3 depicts a driver looking forward with driver gaze angle 33 and driver head angle 35 matching vehicle heading 36. FIG. 4 depicts a driver holding the driver head angle 35 along vehicle heading 36 while the driver gaze angle 33 diverges to one side during visual scanning, for example. FIG. 5 depicts a driver holding the driver gaze angle 36 along vehicle heading 36 while the driver head angle 35 diverges to one side. None of the situations in FIGS. 3-5 would necessitate adjustment of a headlamp projection angle.

Figure 6:
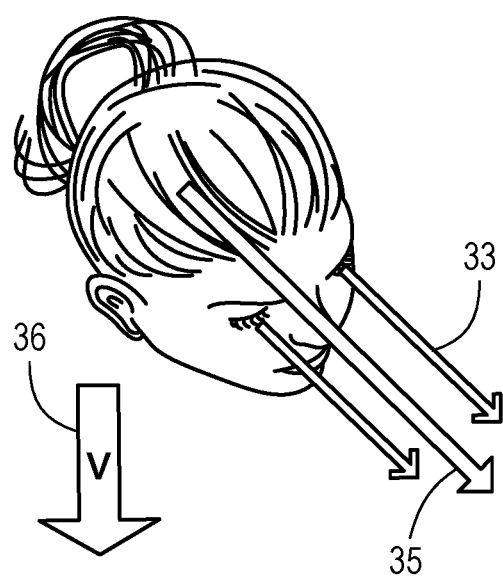
FIG. 6 is a top, schematic view showing a head of a driver with a driver gaze angle and a driver head angle both divergent from a vehicle heading.

FIG. 6 depicts driver gaze angle 33 and driver head angle 35 diverging from vehicle heading 36 in a manner consistent with the driver's main attention being directed away from the forward direction of the vehicle. With driver gaze angle 33 and driver head angle 35 being substantially the same and diverging from vehicle heading 36 by at least a predetermined angle, it depicts a situation which can potentially benefit from redirecting a light beam of a headlamp toward gaze angle 33.

Figure 7:
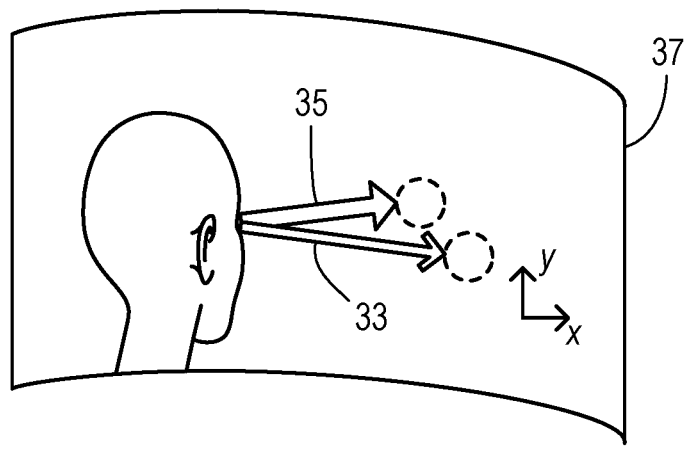
FIG. 7 is a schematic diagram showing projections of a driver gaze angle and a driver head angle in three dimensions.
Figure 8:
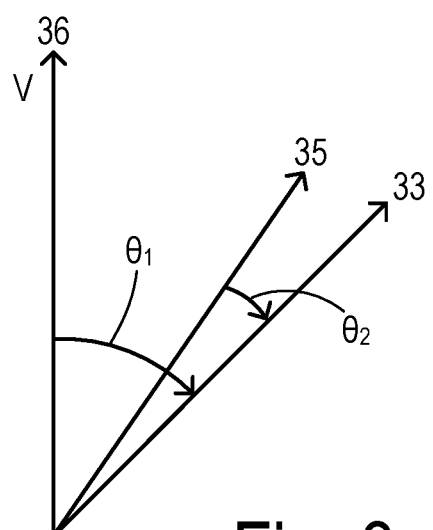
FIG. 8 depicts two-dimensional gaze and head angles relative to a vehicle heading.

FIG. 7 shows a visual plane 37 onto which driver gaze angle 33 and driver head angle 35 are projected. Accordingly, driver gaze angle 33 and driver head angle 35 can be defined according to at least two-dimensional coordinates (x, y). In other words, a gaze direction and a head direction can vary both horizontally (i.e., left-right) and vertically (i.e., up-down), and embodiments of the invention can evaluate the driver's situation using two-dimensional analysis. However, acceptable results may also be obtained more simply by evaluating the angles as projected onto a horizontal plane or other plane as shown in FIG. 8 (e.g., evaluating them as azimuth angles). In a preferred embodiment, a situations for a potential adjustment of a headlamp projection angle may be detected according to an initial determination that driver gaze angle 33 diverges from vehicle heading 36 by at least a first threshold angle $\theta_1$ (e.g., a predetermined value selected between about 15° and about 45°, such as a predetermined value of about 20°). When a difference between driver head angle 35 (projected onto the same plane) and driver gaze angle 33 is less than a second threshold angle $\theta_2$ (e.g., a predetermined value such as about 10°), then a situation is detected in which the projection angle of the light beam can be steered to a new "target angle" which is based on the driver gaze angle. The target angle (i.e., illumination pattern of a headlamp) may be equal to the driver gaze angle (coinciding with the exact spot where the driver is looking) or may be a smaller angle based on a maximum amount of steering for which the headlamp system is capable or on an imposed limitation by regulation or otherwise.

Figure 9:
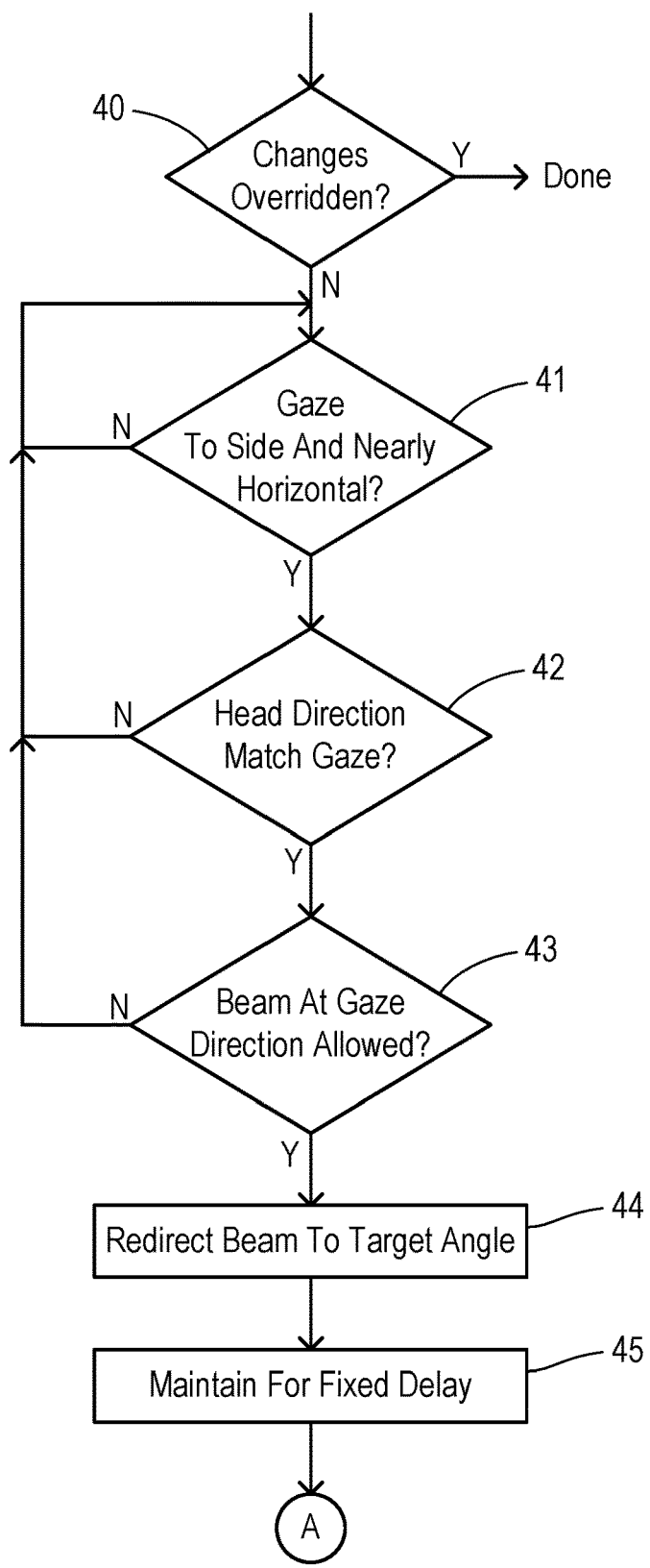
FIGS. 9 and 10 show a flowchart according to one preferred method of the invention.
Figure 10:
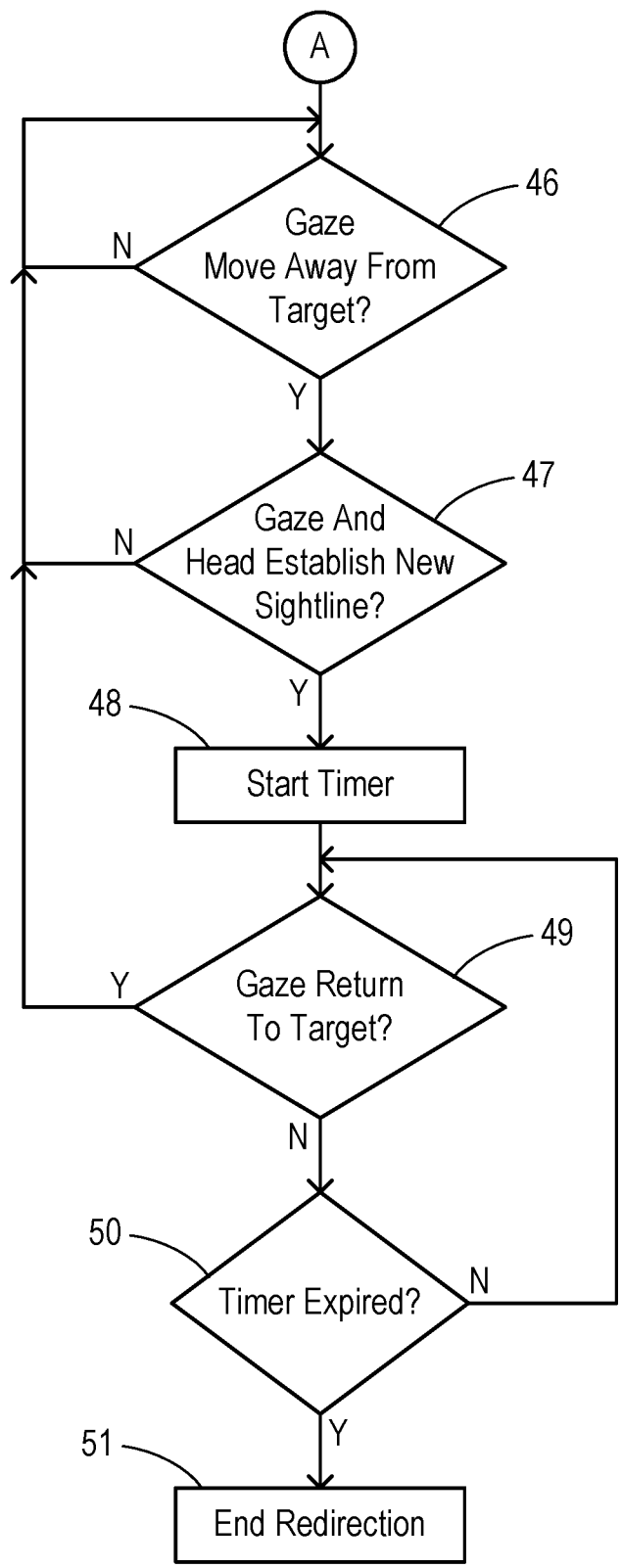

A predetermined method of the invention shown in FIGS. 9 and 10 begins with a check in step 40 to determine whether the making of changes to the headlamp illumination is currently overridden (i.e., prohibited) due to regulations and/or the state of the vehicle and any surrounding traffic. If it is true that headlamp adjustments are not allowed, then the method completes. Otherwise, driver monitoring is activated and a check is performed in step 41 to determine whether the driver's gaze is directed to a side of the vehicle heading and is nearly horizontal (e.g., is directed through the windshield and at an elevation matching the level of the roadway or the surrounding ground. If not, then the driver's gaze angle continues to be monitored in step 41. When a gaze is found which is directed to a side of the vehicle heading and is nearly horizontal, then a check is performed in step 42 to determine whether the driver head angle sufficiently matches the driver gaze angle (e.g., the difference in angles is less than a threshold angle). If not, then a return is made to step 41. Otherwise, a check is performed in step 43 to determine whether adjustment of the corresponding headlamp light beam toward the direction of the gaze angle is allowed (e.g., not prohibited by regulations or other factors). If not allowed, then a return is made to step 41. If allowed, then the light beam is redirected to a target angle in step 44 based on its closest allowed adjustment approaching or equaling the gaze angle. Once the light beam is redirected, it is maintained at the target angle for at least a predetermined fixed delay (e.g., 5 seconds).

After the predetermined fixed delay expires, the method may continue with step 46 in FIG. 10 wherein a check is performed to determine whether the driver gaze angle moves away from the targeted spot (e.g., moves by at least a predetermined angle). Once the driver gaze angle does move away, a check is performed in step 47 to determine whether the driver gaze angle and driver head angle together establish a new sightline away from the old targeted spot. For example, both angles may be restored to values which correspond to the driver looking in the direction of the vehicle heading, which would show that the driver's main attention has shifted from the old target back to the main roadway. If this has not happened, then a return is made to step 46.

Once a new sightline is established based on the gaze angle and head angle having moved away to a different location, the adjustment to the light beam projection angle can be terminated in some embodiments. However, it may be possible that the driver will again turn to the old targeted area for a second look after a brief interval. Therefore, in some embodiments, the redirection to the old target area can be initially retained. This will allow the driver to keep the extra light on the side of the road while glancing over to check traffic conditions and then resume looking for the object or area of interest. Thus, another delay is initiated by starting a timer (e.g., a 10 second timer) in step 48, and then a check is performed in step 49 to determine whether the driver gaze angle returns to the previous targeted area. If so, then a return is made to step 46 and the redirected target projection angle is maintained indefinitely. If the gaze angle has not returned, then a check is performed in step 50 to determine whether the timer has expired. If not, then a return is made to step 49. If the timer has expired, then the redirection of the projection angle is ended in step 51. The termination of the adjustment of the projection angle may be comprised of restoring the projection angle to an angle it had prior to the adjusting.

What is claimed is:

1. A vehicle for travelling on a roadway with a driver, comprising:
    a driver monitor sensing a driver gaze angle relative to a vehicle heading along the roadway and sensing a driver head angle relative to the vehicle heading;
    a headlamp system having a steerable headlamp configured to illuminate the roadway with a light beam along a selectable projection angle; and
    a controller configured to:
        compare the driver gaze angle to a first threshold angle;
        determine a difference between the driver gaze angle and the driver head angle;
        when the driver gaze angle is greater than the first threshold angle and the difference is less than a second threshold angle, then adjust the projection angle to a target angle based on the driver gaze angle;
        detect a succeeding sightline when the driver gaze angle and the driver head angle move away from the target angle by at least a predetermined angle;
        determine whether the driver gaze angle and the driver head angle return to the target angle within a predetermined time; and
        terminate the adjusting of the projection angle to the target angle if the driver gaze angle and the driver head angle do not return to the target angle within the predetermined time.

2. The vehicle of claim 1 wherein the controller is further configured to maintain the projection angle at the target angle for a predetermined delay regardless of a change in the driver gaze angle or the driver head angle.

3. The vehicle of claim 1 wherein the succeeding sightline is comprised of a driver gaze angle and a driver head angle coinciding with the vehicle heading.

4. The vehicle of claim 1 wherein terminating the adjusting of the projection angle is comprised of restoring the projection angle to an angle it had prior to the adjusting.

5. The vehicle of claim 1 wherein the controller is further configured to adjust the projection angle only when the driver gaze angle coincides with the driver looking within a predetermined elevation of the roadway.

6. The vehicle of claim 1 wherein the vehicle heading is comprised of an instantaneous steering trajectory in which the vehicle is travelling on the roadway.

7. The vehicle of claim 1 wherein the driver gaze angle and the driver head angle are determined as respective azimuth angles.

8. A vehicle for travelling on a roadway with a driver, comprising:

a driver monitor sensing a driver gaze angle relative to a vehicle heading along the roadway and sensing a driver head angle relative to the vehicle heading;

a headlamp system having a steerable headlamp configured to illuminate the roadway with a light beam along a selectable projection angle; and a controller configured to:
  compare the driver gaze angle to a first threshold angle;
  determine a difference between the driver gaze angle and the driver head angle; and
  when the driver gaze angle is greater than the first threshold angle and the difference is less than a second threshold angle, then adjust the projection angle to a target angle based on the driver gaze angle; and wherein the controller is further configured to adjust the projection angle only when the driver gaze angle coincides with the driver looking within a predetermined elevation of the roadway.

9. The vehicle of claim 8 wherein the driver gaze angle and the driver head angle are determined as respective azimuth angles.

10. The vehicle of claim 8 wherein the vehicle heading is comprised of an instantaneous steering trajectory in which the vehicle is travelling on the roadway.

\* \* \* \* \*